(12) United States Patent
Mege

(10) Patent No.: US 11,580,525 B2
(45) Date of Patent: Feb. 14, 2023

(54) DEVICE FOR TRANSMITTING AND RECEIVING A WIRELESS RADIO SIGNAL, CORRESPONDING METHOD AND PROGRAM

(71) Applicant: INGENICO GROUP, Paris (FR)

(72) Inventor: Laurent Mege, Portes les Valence (FR)

(73) Assignee: BANKS AND ACQUIRERS INTERNATIONAL HOLDING, Paris (FR)

( * ) Notice: Subject to any disclaimer, the term of this patent is extended or adjusted under 35 U.S.C. 154(b) by 411 days.

(21) Appl. No.: 16/651,220

(22) PCT Filed: Sep. 28, 2018

(86) PCT No.: PCT/EP2018/076530
§ 371 (c)(1),
(2) Date: Mar. 26, 2020

(87) PCT Pub. No.: WO2019/063825
PCT Pub. Date: Apr. 4, 2019

(65) Prior Publication Data
US 2020/0279247 A1 Sep. 3, 2020

(30) Foreign Application Priority Data
Sep. 29, 2017 (FR) ...................... 1759118

(51) Int. Cl.
*G06Q 20/32* (2012.01)
*G07F 7/08* (2006.01)
*H02M 7/02* (2006.01)

(52) U.S. Cl.
CPC ....... *G06Q 20/3278* (2013.01); *G07F 7/0893* (2013.01); *H02M 7/02* (2013.01)

(58) Field of Classification Search
CPC .... H02M 7/02; H02M 1/0012; H02M 1/0032; G06Q 20/3278; G06Q 20/32;
(Continued)

(56) References Cited

U.S. PATENT DOCUMENTS

2009/0215394 A1* 8/2009 Dewan ................. G06Q 20/352
705/17
2013/0173455 A1* 7/2013 Adams ................ H04W 12/082
455/41.1
(Continued)

OTHER PUBLICATIONS

International Search Report and Written Opinion dated Oct. 30, 2018 for corresponding International Application No. PCT/EP2018/076530, filed Sep. 28, 2018.
(Continued)

*Primary Examiner* — Thienvu V Tran
*Assistant Examiner* — Shahzeb K Ahmad
(74) *Attorney, Agent, or Firm* — David D. Brush; Westman, Champlin & Koehler, P.A.

(57) ABSTRACT

A device for transmitting/receiving a wireless radio signal. Such a device includes: a first interface for transmitting/receiving a radio signal according to a first transmission technology; a second interface for transmitting/receiving a radio signal according to a second transmission technology; and an adaptation stage (such as a chip), which extracts data from signals coming from the first interface and/or the second interface.

13 Claims, 2 Drawing Sheets

Figure 2:
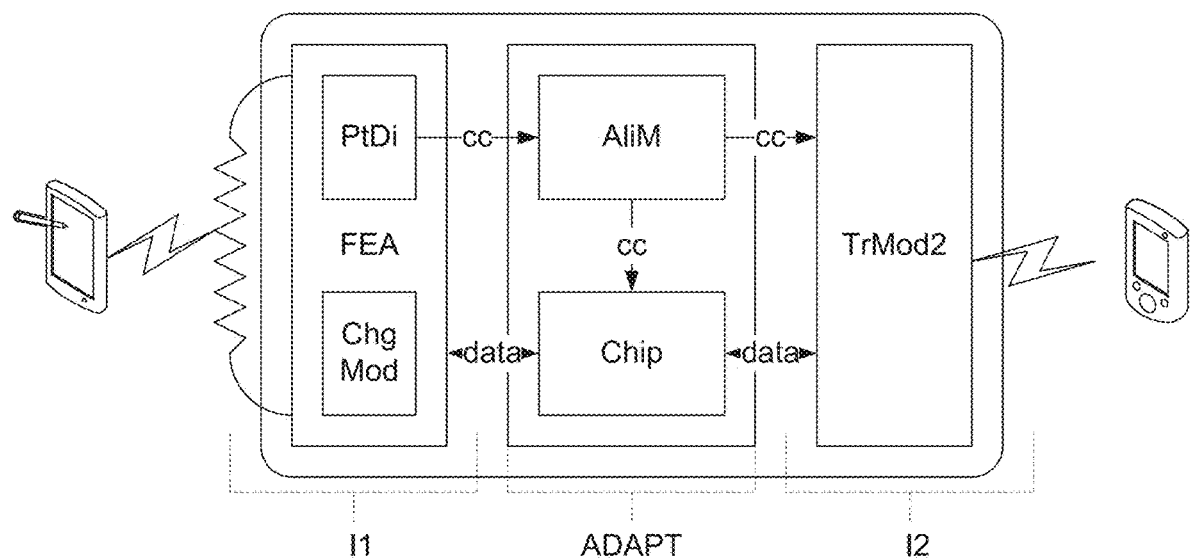

(58) Field of Classification Search
CPC .. G06Q 20/327; G06Q 20/352; G07F 7/0893; G06F 1/26; H02J 2207/10; H04W 4/80; G05B 2219/31197
See application file for complete search history.

(56) References Cited

U.S. PATENT DOCUMENTS

| | | |
|---|---|---|
| 2016/0321645 A1 | 11/2016 | Bendiabdallah et al. |
| 2017/0046677 A1* | 2/2017 | Babu ................. G06K 7/10297 |
| 2018/0191267 A1* | 7/2018 | Keikhosravy ......... H02M 7/219 |
| 2019/0073653 A1* | 3/2019 | Patwardhan ......... G06Q 20/352 |

OTHER PUBLICATIONS

Leong C. Y. et al., "Near Field Communication and Bluetooth Bridge System for Mobile Commerce", Industrial Informatics, 2006 IEEE International Conference On, IEEE PI, Aug. 1, 2006 (Aug. 1, 2006), pp. 50-55, XP031003325.
English translation of the International Written Opinion dated Nov. 9, 2018 for corresponding International Application No. PCT/EP2018/076530, filed Sep. 28, 2018.

* cited by examiner

DEVICE FOR TRANSMITTING AND RECEIVING A WIRELESS RADIO SIGNAL, CORRESPONDING METHOD AND PROGRAM

CROSS-REFERENCE TO RELATED APPLICATIONS

This Application is a Section 371 National Stage Application of International Application No. PCT/EP2018/076530, filed Sep. 28, 2018, which is incorporated by reference in its entirety and published as WO 2019/063825 A1 on Apr. 4, 2019, not in English.

1. FIELD OF THE INVENTION

The invention relates to the field of the transmitting/receiving of radio signals. The invention relates more particularly to a radio-signal transmitting/receiving device that processes the data transmitted in the signal.

2. PRIOR ART

In the last few years, many novel methods for making payment by electronic means have seen the day. These methods are divided chiefly into two categories. There are, on the one hand, methods called "card present" methods and, on the other hand, methods called "card not present" methods. In the "card present" methods, a physical payment card is used to make payment. This is typically the method used by the user when he goes to a commercial establishment and makes payment by bankcard. For example, a user wishing to pay for his purchases by bankcard in a large department store uses his bankcard, which he inserts into a payment terminal, entering a confidential code (also called a PIN code. The payment terminal carries out a certain number of operations to make the payment, including especially a verification of the PIN code or again a communication with a bank-type server (an acquirer) in order to verify the information entered. As an alternative, and more frequently, the contactless or near-field contact (NFC) interface of the payment terminal is used: the user places his contactless card on the payment terminal which is also provided with a contactless interface, and this interface is used to exchange information between the payment terminal and the user's bankcard in order to make a bank transaction and effect payment, in the same way as when the card is inserted into the card reader. These two methods are implemented with the bankcard in the user's possession.

In "card not present" methods, the data of the user's bankcard are used to carry out a transaction without, however, this bankcard being present. This method is used chiefly online to make payments with "e-shopping" (online shopping) sites. Typically, the user enters a certain number of pieces of information related to the bankcard (bearer's name, card number, date of validity and verification code). These data are used to make an "online" transaction immediately verified by one or more bank servers. In this configuration, the card is never physically presented to the merchant.

With the growing development of smartphones and tablets, increasing numbers of methods have been disclosed to enable these communications terminals to make payment themselves by using the user's bankcard data. These methods are typically "card not present" methods. Indeed, although it is fully secure, the communications terminal is not a bankcard and therefore limits itself to using the data of this card to make the payment.

When a communications terminal is used to make a payment, two types of different situations can be encountered: either the communications terminal makes a payment for an application installed in the communications terminal, or it makes a payment with a payment terminal. In the first situation, the bankcard data are processed either entirely or partly within the payment terminal in order to make a payment transaction for the remote purchase of an item or a service (this is a case similar or identical to that of payment on an online shopping site where the user enters bank data except that, in this case, the communications terminal alone takes charge of supplying this data to the online purchasing service: this is typically so, for example, in the "Amazon™" application. In the second situation, the communications terminal behaves like a contactless payment card. It transmits the bankcard data as if it were itself the bankcard (with greater or lesser adaptation depending on the method implemented.) The payment terminal for its part receives these data and processes them as if they came from a bankcard (again with greater or lesser adaptation depending on the method implemented).

To be able to make these data exchanges, the payment terminal and the communications terminal must share a same communications interface. This is predominantly a contactless communications or near-field communication (NFC) interface used both by the payment terminal and the communications terminal. This type of interface is fairly present within payment terminals: indeed, these terminals generally integrate the interfaces required in the specifications that are used for their manufacture. The NFC type payment interface is defined by the "EMV contactless" specifications enabling the performance of contactless payments between a payment terminal and a payment card comprising a contactless interface.

However, the presence of a contactless communications interface is not very widespread for communications terminals. Predominantly, these contactless payment terminals are reserved for premium-range terminals. This means that, as compared with the number of terminals in circulation, few terminals are able to communicate with a payment terminal in order to carry out contactless transactions. There is therefore a need for enabling communications terminals, not provided with contactless communications interfaces (for example NFC interfaces), to carry out communications with terminals (for example payment terminals) that are provided with such an interface.

3. SUMMARY

The present invention makes it possible to at least partly resolve this problem related to the need to have available a plurality of communications interfaces within devices, some of which may lack such interfaces. More particularly, an adaptor device is proposed also called a device for transmitting/receiving a wireless radio signal. Such a device comprises:
 a first interface for transmitting/receiving a radio signal according to a first transmission technology;
 a second interface for transmitting/receiving a radio signal according to a second transmission technology;
 an adaptation stage comprising means for extracting data from signals coming from the first interface and/or the second interface.

Thus, according to the invention, it is possible to make a first terminal compatible with one or more (wireless) radio communications standards used by a second communications terminal.

According to one particular characteristic, the adaptation stage furthermore comprises means for managing the electrical power supply.

According to one particular embodiment, the means for managing the electrical power supply comprise at least one component for converting an alternating current, coming from a signal received at the first transmitting/receiving interface, into a direct current.

Thus, the adaptor device is independent. The electrical energy used to make the device work is the energy directly received from the signal itself. The adaptor device can therefore be used simply without making use of any external power supply, thus providing a terminal with a processing capacity according to a communications protocol over which it does not natively or inherently have mastery.

According to one particular characteristic, the adaptation stage comprises at least one microcontroller.

Thus, it is possible not only to transmit the data in a technology other than the one initially supported by the first signal, but also, to carry out a processing on this data, and especially to implement this data in a buffer memory when the transmitting/receiving bit-rates differ between the two technologies employed.

According to one particular embodiment, the microcontroller is powered by means of a component for the conversion of an alternating current, coming from a signal received at said first transmitting/receiving interface, into a direct current.

According to one particular embodiment, the adaptation stage comprises at least one transmitting/receiving microprocessor coupled to said second interface.

Thus, the device is capable of formatting the data according to the transmission protocol of the second communications interface.

According to one particular embodiment, the first radio-signal transmitting/receiving interface according to a first transmission technology is an NFC interface.

Thus, it is possible to retrieve the energy transmitted by this interface, which continuously sends out an electromagnetic field capable of being converted into electric energy.

According to one particular characteristic, the second radio-signal transmitting/receiving interface according to the second transmission technology is a Bluetooth interface.

It is thus possible to transmit data towards a terminal that has a Bluetooth interface but not NFC technology at its disposal.

According to one particular characteristic, the first radio-signal transmitting/receiving interface comprises at least one coiled antenna.

Thus, an efficient means is available for retrieving or recovering the energy coming from a signal intended for the first communications interface.

According to one particular embodiment, the device takes the form of a disk with a diameter of about four centimeters and a thickness of about one millimeter, such a disk being capable of being affixed detachably to the first terminal.

According to one particular characteristic, the first terminal is a payment terminal having available an NFC interface while the second terminal is a communications terminal, for example of the smartphone or tablet or computer type, having available a Bluetooth communications interface.

According to another aspect, the invention also relates to a system composed of a payment terminal with an NFC interface, an adaptor device as described here above and a communications terminal comprising a Bluetooth communications interface.

According to another aspect, the invention also relates to a method of processing data coming from the transmission of a radio signal transmitted according to a first signal transmission technology. The method is implemented by a transmitting/receiving device as described here above. This method comprises the following steps, consisting in:
  picking up the first radio signal sent out by the first terminal according to a first communications format;
  carrying out a conversion of this first signal into a second signal, according to the second communications format; and
  transmitting out this second signal to the first terminal.

According to a preferred implementation, the different steps of the method according to the invention are implemented by one or more software programs or computer programs, comprising software instructions intended for execution by a data processor according to the invention and being designed to command the execution of the different steps of the methods.

The proposed technique is therefore also aimed at providing a program liable to be executed by a computer or by a data processor, this program comprising instructions to command the execution of the steps of a method as mentioned here above.

This program can use any programming language whatsoever and can be in the form of source code, object code or intermediate code between source code and object code such as in a partially compiled form or in any other desirable form whatsoever.

The invention is also aimed at providing an information medium readable by a data processor, and comprising instructions of a program as mentioned here above.

The information medium or carrier can be any entity or device whatsoever capable of storing the program. For example, the medium can comprise a storage means such as a ROM, for example, a CD ROM or microelectronic circuit ROM or again a magnetic recording means, for example a floppy disk or a hard-disk drive.

Besides, the information medium can be a transmissible medium such as an electrical or optical signal that can be conveyed by an electrical or optical cable, by radio or by other means.

The program according to the invention can be especially downloaded from an Internet-type network.

As an alternative, the information medium can be an integrated circuit board into which the program is incorporated, the circuit board being adapted to executing or to being used in the execution of the method in question.

According to one embodiment, the invention is implemented by means of software and/or hardware components. In this respect, the term "module" can correspond, in this document, equally well to a software component and to a hardware component or to a set of hardware and software components A software component corresponds to one or more computer programs, one or more sub-programs of a program or more generally to any element of a program or a piece of software capable of implementing a function or a set of functions as described here below for the module concerned. Such a software component is executed by a data processor of a physical entity (terminal, server, gateway, router etc.) and is liable to access the hardware resources of this physical entity (memories, recording media, communications buses, electronic input/output boards, user interfaces, etc.).

In the same way, a hardware component corresponds to any element of a hardware unit capable of implementing a function or a set of functions as described here below for the module concerned. It can be a programmable hardware component or a component with an integrated processor for the execution of software, for example an integrated circuit, a smartcard, a memory card, an electronic board for the execution of firmware, etc.

Each component of the system described here above naturally implements its own software modules.

The different embodiments mentioned here above can be combined with one another to implement the invention.

4. FIGURES

Figure 1:
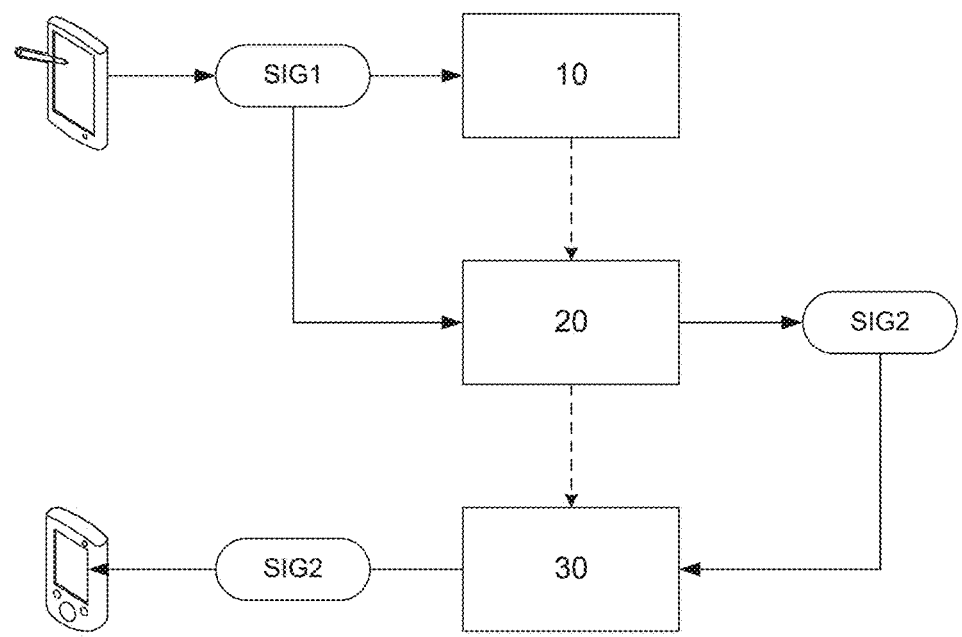
Figure 3:
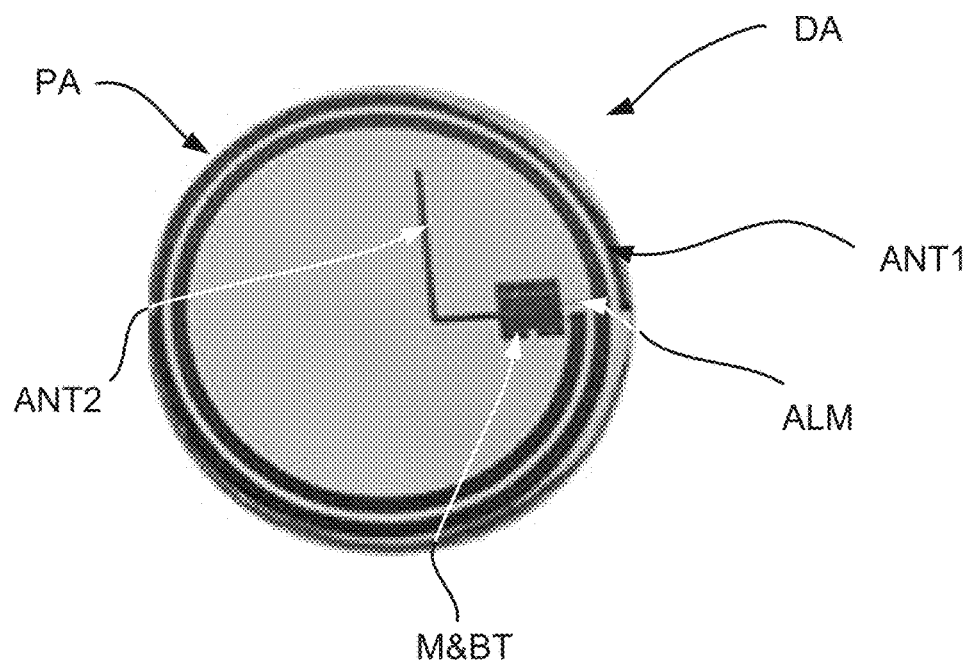
Figure 4:
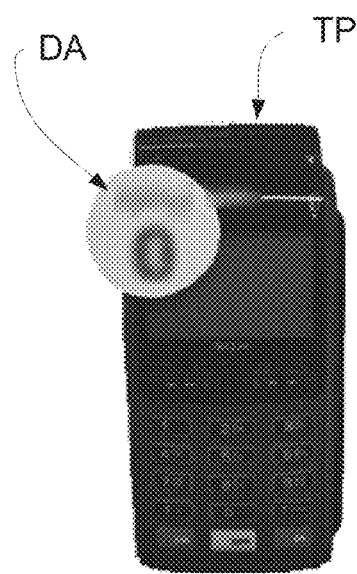
Figure 5:
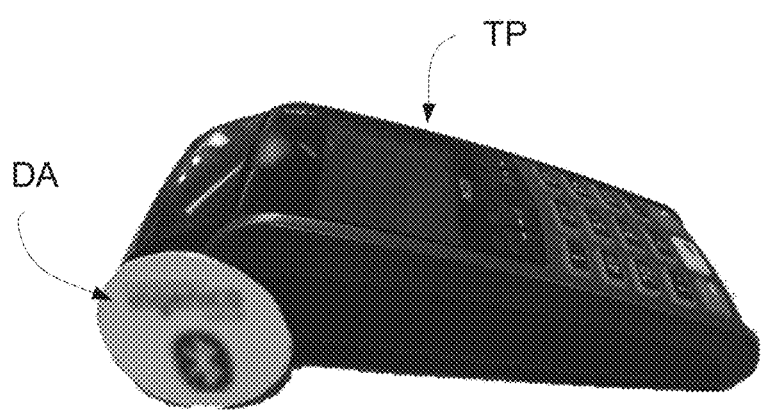

Other features and advantages of the invention shall appear more clearly from the following description of a preferred embodiment, given by way of a simple, illustrative and non-exhaustive example and from the appended figures of which:

FIG. 1 illustrates the method of processing implemented by the adaptor device of the invention;

FIG. 2 presents the adaptor device of the invention, in a schematic view;

FIG. 3 presents an embodiment of the adaptor device of the invention;

FIG. 4 presents an example of positioning of the adaptor device of the invention according to a first embodiment;

FIG. 5 presents an example of positioning of the adaptor device of the invention according to this first embodiment.

5. DESCRIPTION

5.1. Reminder of the Principle

The general principle of the invention, situated in the context of a communications call between two terminals that do not dispose of a common wireless communications technology, consists in providing one of the two terminals with an adaptor device also called, in the present document, a signal transmitting/receiving bridge device. This adaptor has the function of carrying out a signal conversion. The adaptor is more particularly intended to enable a communication call between the terminal having an NFC communications interface and a terminal having a BLE (Bluetooth Low Energy) communications interface. The technique generally is also applicable to Zigbee technology. It can be supposed that there will be available an NFC/Zigbee adaptor device or again a Bluetooth/Zigbee adaptor device (provided that an adequate power supply is available, for example an energy storage, as explained here below).

This adaptor device can take several different forms. An appropriate form, described in greater detail here below, consists of a chip or a pastille, for example made of over-molded plastic that can be placed so as to be facing a communications antenna on one of the two terminals. In general, the adaptor device comprises:

- a first transmitting/receiving interface (11) for transmitting/receiving a radio signal according to a first transmission technology;
- a second transmitting/receiving interface (12) for transmitting/receiving a radio signal according to a second transmission technology;
- an adaptation stage (ADAPT) comprising means of extraction of data from signals coming from the first interface and/or the second interface.

The device converts the signal sent by the first terminal into a signal addressed to the second terminal.

Thus, the adaptor in itself comprises electronic components necessary and sufficient to carry out the following method of adaptation (FIG. 1):

picking up (10) a first (wireless) radiating signal (Sig1) sent out by a terminal according to a first communications format;

converting (20) this first signal into a second signal (Sig2), according to a second communications format; and transmitting (30) this second signal (Sig2) to the destination or addressee communications terminal.

As described in detail here below, in at least one embodiment, the energy contained in the first communications signal is used (at least in part) to power the adaptor during the time taken to carry out the picking up, conversion and transmitting steps. In other words, the adaptor device is autonomous in terms of energy. When it is not place on or brought near the sender terminal (which provides energy in the form of a signal), it is inert. It goes into operation on receiving a signal with energy high enough for the adaptor stage to be capable of converting the first radio signal into a second radio signal.

Thus, in a first aspect, as explained here above, the invention relates to a device, for example a detachable device that is adjoined to a terminal or again an adhesive device, such as a tag. This device acts as a bridge between a first terminal, for example a payment terminal, that has available a first wireless (for example NFC) communications interface and a second terminal (for example a smartphone or tablet type communications terminal) that has available a second wireless (for example Bluetooth) communications interface. By their very nature, these two terminals are not capable of communicating with each other. Since the first and second communications interfaces are incompatible, through the device that is the object of the invention, a signal sent out by a first terminal is converted into a signal that can be recognized by the second terminal.

In one specific embodiment of the invention, the adaptor device is in charge of converting a signal sent by a terminal in an NFC format into a Bluetooth signal, comprehensible to a terminal having available a Bluetooth interface. To this end, as explained here below, the adaptor device comprises means needed for the conversion. Conversely, the adaptor device can also include means for the inverse conversion of a signal sent by a communications signal emitting in Bluetooth mode into a signal capable of being picked up and understood by a communications terminal (or payment terminal) having an NFC interface.

The means implemented in this embodiment are described with reference to FIG. 2. The adaptor device (ABr) comprises an analog front end (FEA) comprising an antenna (Ant) in charge of the reception of the NFC signal, a current conversion component (PtDi) and a charge modulation component (ChgMod). This analog front end (FEA) constitutes a first transmitting/receiving interface in this embodiment. Using these components, the analog front end (FEA) is capable of producing a direct current (cc) from the received signal and of transmitting the data of the signal to a microcontroller (denoted as Chip). The microcontroller (Chip) is interfaced with the power supply management module (AliM), receiving the direct-current (cc) power supply coming from the current conversion component (PtDi). The function of the microcontroller (Chip) is to process the data received either from the first terminal or from the second terminal to carry out a format adaptation and/or an encoding adaptation, etc. In this embodiment, the microcontroller (Chip) and the power supply management module (AliM) constitute the adaptation stage. The data are processed by a transmitter (TrMod2) to be transmitted to and/or received from the second communications terminal. In this embodiment, the transmitter (TrMod2) and its transmission antenna constitute the second transmitting/receiving interface. Depending on the embodiments, the transmitter can take charge of a greater or a smaller number of processing operations related to the communications protocol of the standard in question.

The conversion of the signals comprises the processing of data composing this signal. The data are for example buffered (put into a buffer memory) to be sub-divided or redefined as a function of the target format (first or second format, according to the sense of the communication) and re-transmitted accurately as a function of this format. The conversion is entirely or partly implemented by the microcontroller and/or by another means of transmission integrated into the adaptor device, such as for example the transmitter (TrMod2).

In one embodiment described here below, the microcontroller (Chip) processes the data of the NFC signal to convert them into Bluetooth signal data. Conversely, it receives the Bluetooth data and converts them into NFC data. The microcontroller (Chip) is connected to a Bluetooth transmitter, this Bluetooth transmitter being also connected to the power supply management module (AliM) in order to receive a power supply in direct current (cc) coming indirectly from the energy transported by the signal received from the first communications interface.

Thus, in this embodiment, the adaptor device is powered by the NFC signal. This NFC signal is sent out with a frequency of the order of 13.56 MHz. The current generated by an NFC signal (by the electronic magnetic field generated to produce an NFC signal) is of the order of about ten to about a hundred milliamperes. Thus, the current conversion component, which converts the alternating current of the NFC signal into a direct current, is capable of delivering, to the power supply management module, a current of the order of some tens of milliamperes so long as the NFC transmission is implemented. The microcontroller and the Bluetooth transmitter between them consume about five to ten milliamperes. Thus, thanks to the NFC signal, the adaptor device is capable of carrying out processing operations of receiving, conversion and transmitting so long as the 13.56 MHz NFC signal carrier is generated, i.e. throughout the NFC interfacing or dialog carried out by the first terminal (the one having the NFC interface), i.e. throughout the generation of the NFC carrier. Indeed, one particular feature of NFC technology is that, throughout the data transmission, it generates a carrier intended for the NFC device with which the terminal wishes to communicate. This is for example the case for a payment terminal. In any case, the device of the invention is autonomous. It necessitates no external power supply, any more than it necessitates the use of a battery-type internal power supply.

A device according to the invention can be implemented with other data-transmission technologies inasmuch as the energy generated during the transmission of a signal of one of the technologies employed (for the terminal 1 or the terminal 2) is sufficient to power a converter, whether continuously or in bursts. The general principle remains the same: retrieving energy in the form of an alternating current, converting this current into direct current, if necessary storing the electrical energy obtained (for example by means of one or more capacitors), processing the data received and transmitting data via the second communications channel. The use of a capacitor (to store an electrical charge) is not necessary when the first signal is sent out continuously throughout the transaction. By contrast, when the first signal is sent out in bursts (for purposes of energy savings in monitoring mode), and when it is therefore interrupted in time, the use of electrical energy storage means can be worthwhile so as to enable the adaptor device to work relatively independently of these bursts.

5.2. Particular Embodiment

In this section, we describe a specific embodiment adapted to an implementation between a payment terminal provided with an NFC interface and a communications terminal provided with a Bluetooth interface. The different technical characteristics are the following.

Power Supply:

The 13.56 MHz contactless NFC interface integrated into the payment terminals is EmvCo-compatible. The EmvCo specification describes the minimum and maximum levels of fields in a reference volume. The generated field enables a contactless remote power supply with a cryptoprocessor up to a distance of four centimeters. The current consumed by the NFC/Bluetooth adaptor device is about the following: 5 mA for transmitting and 5 mA for receiving. This value is far below the current that can be obtained with the NFC interface. The current conversion component detects the high-frequency carrier to generate a DC supply voltage to power the NFC/Bluetooth component.

The customer application of the payment terminal enables the following:
  The total control of the field (from its opening to its closure);
  The generation of proprietary frames for the steering of the adaptor device.

The 13.56 MHz carrier is generated continually throughout the duration of the dialog (transaction) by the customer application of the payment terminal.

NFC Dialog or Interfacing:

The dialogue relies, for the low-level part, on the 14443 standard (on which the EmvCo specification relies):
  Uplink (Reader to Bridge):
    amplitude modulation according to the two types of modulations described in the standard;
    retro-modulation: modulation of charge by variation of impedance in air of the secondary winding of the transformer created by the antenna of the payment terminal and the NFC antenna of the adaptor device.
  Microcontroller:
    Enables the digital interface between the NFC analog front end and the Bluetooth analog front end, especially the buffer storage of the data to be transferred, the proprietary encoding/decoding of the NFC frames, the encoding/decoding of the Bluetooth frames
  Bluetooth Dialog:
    The Bluetooth antenna is integrated into the adaptor device. The digital modulations will be those recommended by the Bluetooth standard.

In this embodiment, the adaptor device is intended to enable the setting up of a communications link between a payment device having available an NFC wireless interface and a communications terminal having available a Bluetooth wireless interface. The goal is to be able to make a payment transaction between these two terminals. The protocol adaptations needed to enable mutual comprehension between the two devices are not described here. These protocol adaptations can be made independently either on the communications terminal side or on the payment terminal side or directly within the adaptor device. In this embodiment, it is assumed that the adaptor device comprises a microcontroller capable of carrying out a processing of the data received and/or a buffer storage of this data.

5.3. Application to the Dialog or Interfacing Between a Payment Terminal and a Communications Terminal In this embodiment, presented with reference to FIG. 3, the adaptor device (DA) takes the form of a chip (PA), for example made of plastic, with a thickness of the order of one millimeter and a diameter of the order of several centimeters. The diameter is a function of the size of the coiled antenna (ANT1) intended to receive the NFC signal. It is for example of the order of one to four centimeters in one embodiment. The NFC coiled antenna (ANT1) occupies the rim of the chip (PA). It picks up the signal (and the energy from this signal) and powers (ALM) the entire adaptor device, including the microcontroller and the Bluetooth transmitter (M&BT) which herein form one and the same unit. The Bluetooth signal is sent out by means of the dedicated antenna (ANT2).

The adaptor device is placed on the payment terminal, for example by means of an adhesive or a scratch type tape. The device is placed in proximity to the place in which the NFC antenna of the payment terminal is situated in order to maximize the energy received from the payment terminal and optimize the receiving of data. However, the magnetic field "lines" enable power to be supplied to the low-consumption module at the periphery of the antenna integrated into the payment terminal. Indeed, these "lines" do not stop at the reference volume defined by the standard but remain activated all around the antenna. It is therefore possible to power the bridge on the side of a product, especially with the low consumption required by the Bluetooth transmitter. The two FIGS. 4 and 5 illustrate two locations that could be suited to the use of the adaptor device of the invention. In the example of FIG. 4, the adaptor device (DA) is positioned so as to be facing the payment terminal (TP), in proximity to the display screen of this terminal. This position makes it possible to bring the communications terminal closer to the screen, as is done when it is desired to make a contactless payment. In the example of FIG. 5, the adaptor device (DA) is positioned on the side of the payment terminal (TP): the advantage of this positioning is that it does not interfere with the display on the screen. The communications terminal is then brought closer to the adaptor device (DA) to make a payment.

The adaptor device can be placed and removed as needed by the merchant who uses it. For example, the device need not be put into position unless it is necessary to carry out a payment transaction by using a customer's communications terminal, said terminal having available only a Bluetooth type communications interface.

The invention claimed is:

1. A method for conducting a transaction between a communication terminal and a payment terminal, the method comprising:
   fixing a communication adapting device on a payment terminal;
   receiving by a first communication interface of the communication adapting device from an antenna of the payment terminal a first signal transmitted by the payment terminal and addressed to the communication terminal, wherein the first signal has a first signal communication format and is transmitted according to a first transmission protocol and wherein the first signal communication format is a near-field communication (NFC) format and the first transmission protocol is a NFC transmission protocol;
   extracting energy from the first signal by an electrical power supply unit of the communication adapting device coupled to the first communication interface;
   supplying power to the communication adapting device by the electrical power supply unit from the extracted energy, wherein the communication adapting device is fixed in a place on the payment terminal so that the extracted energy fully powers the communication adapting device;
   converting by the first communication interface the first signal into a second signal having a second signal communication format; and
   transmitting the second signal to the communication terminal by a second communication interface of the communication adapting device, wherein the second signal is transmitted according to a second transmission protocol.

2. The method of claim 1, wherein the second interface is a Bluetooth interface.

3. The method of claim 1, wherein the extracted energy has a shape of an alternating current, the method further comprising converting the alternating current into a direct current by the electrical power supply unit and supplying the direct current to power the communication adapting device.

4. The method of claim 1, further comprising:
   receiving by the second communication interface a third signal transmitted by the communication terminal and addressed to the payment terminal, wherein the third signal has the second signal communication format and is transmitted according to the second transmission protocol;
   converting by the second communication interface the third signal into a fourth signal having the first signal communication format; and
   transmitting the fourth signal to the antenna by a first communication interface, wherein the fourth signal has the first signal communication format and is transmitted according to the first transmission protocol.

5. The method of claim 1, wherein the communication adapting device is removably fixed on the payment terminal.

6. A payment terminal comprising:
   an antenna; and
   a communication adapting device fixed on the payment terminal, the communication adapting device comprising:
   a first communication interface coupled to the antenna and configured to receive from the antenna a first signal transmitted by the payment terminal and addressed to a communication terminal, wherein the first signal has a first signal communication format and is transmitted according to a first transmission protocol and wherein the first signal communication format is a near-field communication (NFC) format and the first transmission protocol is a NFC transmission protocol;
   an electrical power supply unit coupled to the first communication interface and configured to extract energy from the first signal and to supply the extracted energy to the communication adapting device when the first communication interface receives the first signal, wherein the communication adapting device is fixed in a place on the payment terminal so that the extracted energy fully powers the communication adapting device;

an adaptation unit configured to convert the first signal into a second signal having a second signal communication format; and a second communication interface configured to transmit the second signal to the communication terminal, wherein the second signal is transmitted according to a second transmission protocol.

7. The payment terminal of claim 6, wherein the second interface is a Bluetooth interface.

8. The payment terminal of claim 6, wherein the extracted energy has a shape of an alternating current, the electrical power supply unit further comprising an alternating current to direct current converter configured to convert the alternating current into a direct current and to supply the direct current to power the communication adapting device.

9. The payment terminal of claim 6, further wherein:
the second communication interface is configured to receive a third signal transmitted by the communication terminal and addressed to the payment terminal, wherein the third signal has the second signal communication format and is transmitted according to the second transmission protocol;

the communication adapting device comprises a microcontroller configured to convert the third signal into a fourth signal having the first signal communication format, wherein the fourth signal has the first signal communication format and is transmitted according to the first transmission protocol; and the first communication interface is configured to transmit the fourth signal to the antenna of the payment terminal.

10. The payment terminal of claim 9, wherein the microcontroller is powered by the electrical power supply unit.

11. The payment terminal of claim 6, wherein the communication adapting device is removably fixed on the payment terminal.

12. The payment terminal of claim 6, wherein the communication adapting device comprises a coiled antenna that is coupled to antenna of the payment terminal.

13. The payment terminal of claim 6, wherein the communication adapting device has a shape of a chip, the coiled antenna being arranged along a rim of the chip.

* * * * *